United States Patent [19]

Lagnier

[11] Patent Number: 4,794,965
[45] Date of Patent: Jan. 3, 1989

[54] TREAD FOR RADIAL TIRE THE ELEMENTS IN RELIEF OF WHICH ARE PROVIDED WITH INCISIONS HAVING BROKEN LINE OR UNDULATED LINE TRACES IN THE DIRECTION OF THEIR DEPTH

[75] Inventor: Alain Lagnier, Romagnat, France

[73] Assignee: Compagnie Generale des Etablissements Michelin, Clermont-Ferrand Cedex, France

[21] Appl. No.: 162,664

[22] Filed: Mar. 1, 1988

[30] Foreign Application Priority Data

Mar. 10, 1987 [FR] France .................... 87 03371

[51] Int. Cl.$^4$ ............................................. B60C 11/12
[52] U.S. Cl. ........................... 152/209 R; 152/DIG. 3
[58] Field of Search ........ 152/209 R, DIG. 3, 209 D, 152/209 A, 209 B

[56] References Cited

U.S. PATENT DOCUMENTS

| 3,462,328 | 8/1969 | Buckland | 152/209 R |
| 4,298,046 | 11/1981 | Herbelleau et al. | 152/209 R |
| 4,598,747 | 8/1986 | Flechtner | 152/209 R |

FOREIGN PATENT DOCUMENTS

| 1480932 | 3/1969 | Fed. Rep. of Germany . |
| 1420278 | 10/1965 | France . |
| 61-44008 | 7/1986 | Japan . |
| 1150295 | 4/1969 | United Kingdom . |
| 1269707 | 4/1972 | United Kingdom . |
| 2053817 | 2/1981 | United Kingdom . |

Primary Examiner—Michael W. Ball
Assistant Examiner—Geoffrey L. Knable
Attorney, Agent, or Firm—Brumbaugh, Graves, Donohue & Raymond

[57] ABSTRACT

In order to improve the wear life of a tread having elements in relief which are provided with numerous incisions, each element in relief which is defined by circumferential grooves and transverse grooves comprises an even number of incisions which have rectilinear traces on the surface of the tread and, in cross-section, broken line or undulated line traces, the mean axes of which are perpendicular to the surface of the tread, and in such manner that the trace of one incision is identical to the symmetrical trace, with respect to its mean axis, of the trace of a circumferentially adjacent incision.

9 Claims, 3 Drawing Sheets

TREAD FOR RADIAL TIRE THE ELEMENTS IN RELIEF OF WHICH ARE PROVIDED WITH INCISIONS HAVING BROKEN LINE OR UNDULATED LINE TRACES IN THE DIRECTION OF THEIR DEPTH

BACKGROUND OF THE INVENTION

The present invention concerns the tread of a road tire having a radial carcass reinforcement and a tread reinforcement and more particularly intended for traveling on snow-covered, icy or wet ground.

Such a tread is generally formed of elements in relief (ribs or blocks), separated from each other in circumferential direction and/or in transverse direction by grooves and provided with numerous incisions or slits the width of which is other than zero but far less than the width of the circumferential and transverse grooves which define the elements in relief. The width of an incision, depending on the size of tire in question, is generally between 0.1 mm and 2 mm.

French Patent No. 2,461,602 describes the means for imparting to the tire better longitudinal adherence on the types of ground in question, both under drive torque and under braking torque. These means consist in providing the elements in relief of the lateral zones of the tread with incisions of substantially transverse orientation on the tread but inclined with respect to the normal to the surface of the tread by an angle of at most 45° in the direction of rotation of the tire, and in providing the elements in relief of the central zone with incisions inclined in the direction opposite the direction of rotation. Thus the incisions of the lateral elements in relief increase adherence during the acceleration while the incisions of the elements in relief of the central zone increase adherence during the braking.

It is known to the man skilled in the art that, in general, any feature the purpose of which is to improve the adherence of a tire causes a decrease of the resistance to wear. This is the case with the inclination of the incisions since the improvement obtained with respect to adherence to the ground in question is the consequence of the formation of abnormal wear of the strips of rubber defined by the facing portions of two successive incisions which are substantially parallel to each other. Depending on the orientation of the incision with respect to the direction of rotation of the tire, this wear makes it possible to preserve effective edges of the strips of rubber.

This type of wear, also known as irregular wear, is not however without drawbacks. It detrimentally affects not only the strips of rubber contained between two adjacent incisions but also the element in relief or block itself, in particular as a result of the considerable variation in the distances between the incisions closest to the grooves defining the block and the walls of the grooves.

Furthermore, as the incisions are inclined with respect to the normal to the surface of the tread at angles of opposite sign and not necessarily equal in absolute value, depending on whether they are located at the edge of the tread or at the center thereof, the irregular wear which detrimentally affects the elements in relief differs as a function of the axial position thereof on the tread. The same is true in respect of the rate of wear of these blocks which causes the surface of the tread to be devoid of uniformity, thus detrimentally affecting the wear life of the tire and the effectiveness of the incisions as from a certain rate of wear.

SUMMARY OF THE INVENTION

The object of the present invention is therefore to improve the appearance of the tread of the tire in question after wear, while retaining maximum effectiveness of the incisions with respect to adherence on all surfaces on which the tire is apt to run either under braking torque or under driving torque, and this while avoiding the occurrence of cracks at the bottom of incisions which might cause the tearing of strips of rubber between two adjacent incisions.

The solution is based on the judicious use of slits or incisions having, on the one hand, rectilinear traces on the surface of the tread and, on the other hand, broken line or undulated line traces over their entire depth in a section plane which is perpendicular to both the mean orientation of the incisions on the surface of the element in relief and the surface of the tread.

Incisions which have nonlinear traces in cross-section are known. Thus French Patent No. 1,420,278, in order to avoid the extensive deterioration which might occur in the incisions of a tread, caused by the penetration of foreign bodies, teaches imparting to the cross-section of an incision a bent or curved shape in its median part. In the upper and lower parts, the cross-section is perpendicular to the surface of the tread; these incisions form small angles with the circumferential direction. They therefore do not give rise to preferential forms of wear and cannot impart to the tread the necessary adherence under driving torque or braking torque.

The tread, in accordance with the present invention, has at least elements in relief separated by transverse and circumferential grooves and provided with incisions of a width other than zero, having rectilinear traces on the surface of the tread. These traces form with the axial direction angles at most equal in absolute value to 30°. These traces are parallel to each other and to the traces of the transverse delimiting grooves, and are such that the axial dimension of a strip of rubber defined by two adjacent incisions is at least equal to 30% of the axial width of the element in relief at the level of the strip of rubber in question. The above tread is characterized by the fact that each element in relief comprises an even number of incisions of equal depth and having in cross-section over the entire depth broken line or undulated line traces with mean axes perpendicular to the surface of the tread and formed of segments forming angles which are other than zero and at most equal to 40° with the normal to the said surface, the trace of an incision being identical to the symmetrical trace, with respect to its means axis, of the trace of a circumferentially adjacent incision.

There are considered as circumferential grooves either rectilinear continuous grooves or, for instance, zigzag grooves, or else portions of grooves of substantially circumferential orientation, that is to say forming angles of less than 20° with the circumferential direction. Similarly, there are considered as transverse grooves, grooves or portions of grooves having an orientation which forms with the axial direction of the tire an angle at most equal in absolute value to 30°.

The characteristics and advantages of the present invention will be better understood from the following description which refers to the drawing, in which embodiments of the invention are shown by way of illustration and not of limitation.

DETAILED DESCRIPTION OF THE INVENTION

Figure 1:
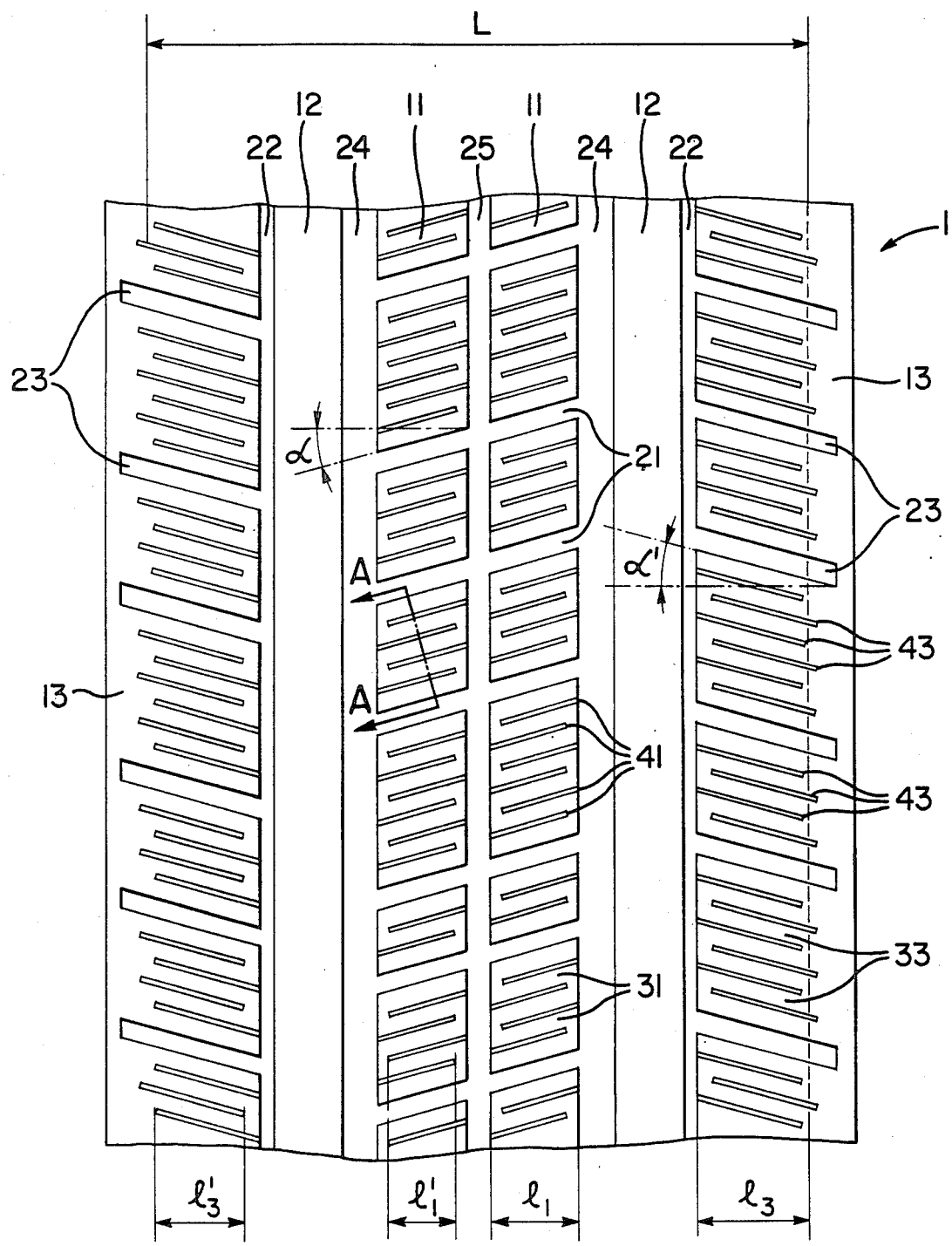
FIG. 1 is a plan view, not shown to scale, of a tread having incisions in accordance with the invention.

The portion of tread 1 of a 175 R 14 X tire, shown in FIG. 1, has elements in relief or blocks 11 in its central zone, blocks 13 in its lateral zone and circumferential ribs 12 between these two rows of blocks. The blocks 11 and 13 are separated in circumferential direction by grooves 21, 23, respectively, of substantially transverse orientation and parallel to each other (grooves whose orientations differ by an angle of at most 10° are considered parallel). The blocks 13 are separated from the ribs 12 by circumferential grooves 22 of slight width (2 to 4 mm) as compared with the width of the circumferential grooves 24 (5 mm to 7 mm) separating the ribs 12 from the blocks 11 of the central rows, these blocks 11 being themselves separated from each other by a circumferential groove 25 of intermediate width (4 mm to 6 mm).

The blocks 11, 13 are, in accordance with the invention, provided with incisions 41, 43, respectively, presenting on the surface of the tread 1 rectilinear traces with parallel orientations between them (incisions whose orientations on the surface of the tread differ by an angle of at most 10° are considered to be parallel to each other), and substantially transverse, with an orientation identical to the orientation of the grooves 21, 23. These incisions 41, 43 are present in an even number on each block 11, 13 of the tread 1. In the case of the tire size in question, this number is 2, 4 or 6.

The strips of rubber 31 defined by the incisions 41 of the blocks 11 of the central zone of the tread 1 have identical axial dimensions ($l'_1$) equal to 75% of the constant axial width ($l_1$) of the blocks 11. The same is true in respect of the strips of rubber 33 of the blocks 13, the axial dimension ($l'_3$) being equal to 70% of the axial width ($l_3$) bearing on the ground of the blocks 13.

Figure 2:
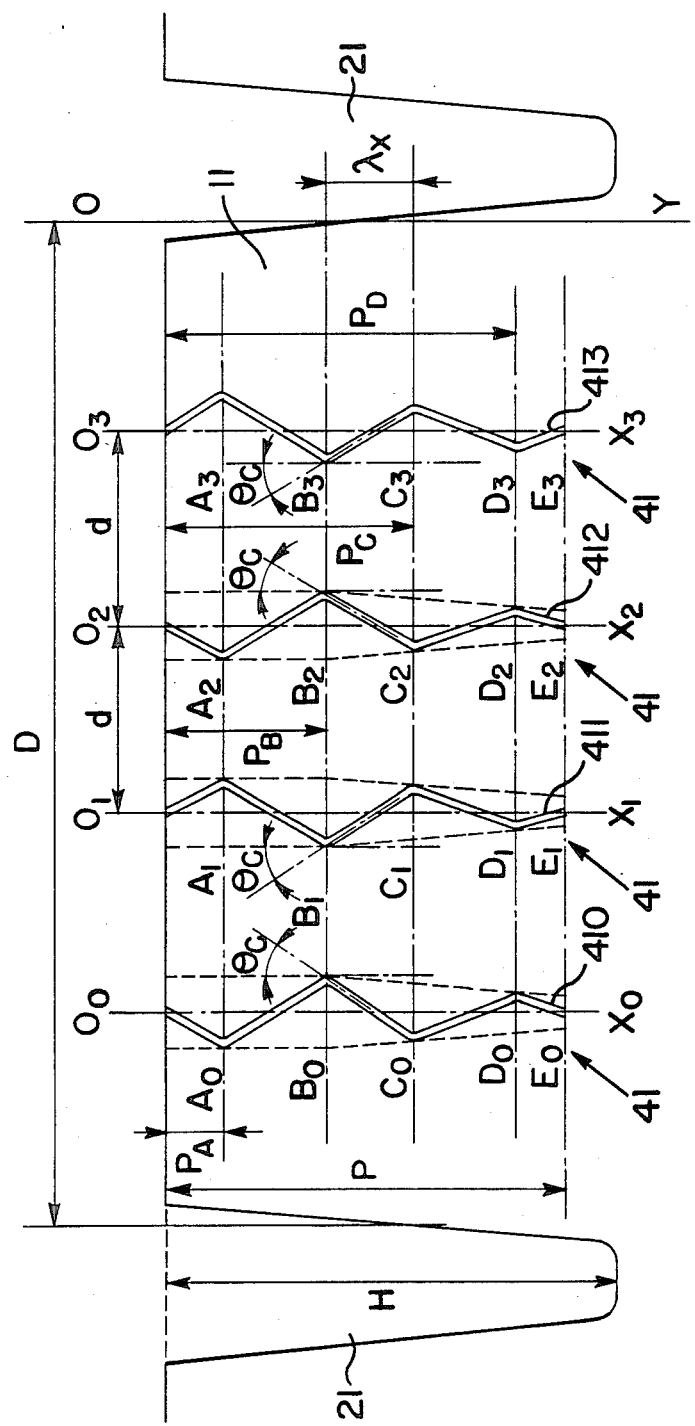
FIG. 2 is a detail view, not shown to scale, on a plane of radial section along the line AA of FIG. 1.

In FIG. 2 of the drawing there can be noted the respective traces in cross-section of the four incisions 41 of a block 11 of the central zone of the tread 1. These incisions 410, 411, 412, 413 have the same depth P, which can be between 0.4 H and 1.5 H, H being the depth of the transverse grooves 21. Each incision 410, 411, 412, 413 has a zigzag trace, the mean axis of which $0_n X_n$, n assuming the values of 0 to 3, is perpendicular to the surface of the tread 1. This trace, for instance of the incision 411 (n=1), is formed of radially successive segments $0_1 A_1$, $A_1 B_1$, $B_1 C_1$, $C_1 D_1$, $D_1 E_1$ defining four crests $A_1$, $B_1$, $C_1$, $D_1$, the points $0_1$ and $E_1$ being on the mean axis $0_1 X_1$. It is identical to the symmetrical trace with the respect to the mean axis $0_0 X_0$ of the trace $0_0$, $A_0$, $B_0$, $C_0$, $D_0$, $E_0$ (n−1=0) of the circumferentially adjacent incision 410.

Stated differently, the corresponding crests, namely $A_n$, $B_n$, $C_n$ or $D_n$ (n varying from 0 to 3) are located at the same radial distance $p_A$, $p_B$, $p_C$, and $p_D$, respectively, from the surface of the tread 1.

As to the corresponding segments, for instance $B_n C_n$ ($B_0 C_0$, $B_1 C_1$, $B_2 C_2$, $B_3 C_3$) of the incisions 410, 411, 412 and 413, respectively, they form with the perpendicular to the surface of the tread 1, angles $\theta c$ of 30° which are equal in absolute value but alternately of opposite sign in the circumferential direction. If one considers the trigonometric direction as positive, then said segments form angles of $-\theta c + \theta c - \theta c + \theta c$, respectively. In other words, as shown in FIG. 2, adjacent traces are mirror images.

Due to the variation, as a function of depth, of the thicknesses of the strips of rubber which they define, which variation is of opposite direction from one strip to the next, such incisions, present in an even number on a given element in relief, permit greater uniformity of the wear of the tread 1 and, correlatively, a longer life thereof, while having at all times an equal number of rubber strips which are effective upon braking and acceleration. In addition to the fact that such incisions also make it possible, as is known, to avoid the penetration, and in particular the forwarding towards their bottoms, of objects foreign to the tire, they produce numerous other advantages. It is thus possible to obtain a tire which has effective adherence under driving torque and braking torque whatever the direction in which it is mounted on the rim.

As shown in FIG. 2, it is sufficient for the mean axes $0_0 X_0$, $0_1 X_1$, $0_2 X_2$, $0_3 X_3$ to be equidistant from each other, the circumferential distance d between two mean axes being also the circumferential distance which separates the mean axis $0_3 X_3$, $0_0 X_0$ of an incision adjacent to the transverse groove 21 which defines the element in relief from the mean axis OY of the wall of the transverse groove 21.

If one designates the radial distance between two successive crests of one and the same incision, or pseudo-wavelength, as $\lambda_x$ and if a is the circumferential distance, or amplitude, between two crests spaced radially apart by $\lambda_x$, then the radial distance $\lambda_x$ is at least equal to 0.125 P and the amplitude a is preferentially between 0.5 times and 1.5 times the minimum radial distance $\lambda_x$.

It is also advantageous for the number of crests of one and the same incision to be at least equal to 3 and for the circumferential distance d between the mean axes of two neighboring incisions or between the mean axes of the walls of the defining grooves and the mean axes of the closest incisions to be a constant at least equal to 3.5 mm, whatever the circumferential dimension D of the element in relief in question.

Another unexpected advantage resides in the possibility of directly influencing not only the respective rigidities of the strips of rubber on one and the same element in relief but also the respective rigidities of the elements in relief on the tread. Said rigidities have a definite influence on the forms of wear and on the rates of wear. They also exert, in combination with the inherent rigidities of the underlying reinforcements which reinforce the tread, a substantial influence on the road behavior qualities of a tire (cornering, stability on a straight line, response to the steering wheel, comfort, noise, etc.) on a given vehicle having its own properties.

The studies carried out by the Applicant have shown that it is advantageous, in the case of a tire the thickness of the tread of which is less than 12 mm and the tread reinforcement of which is formed either entirely of metal cables or of a combination of metal cables and textile cables, for a given element in relief or block to be provided with an even number of incisions, each incision having a circumferential distance or amplitude a and a radial distance or pseudo-wavelength $\lambda_x$ which are constant as a function of the depth P of the incisions.

Figures 3A, 3B, 3C:
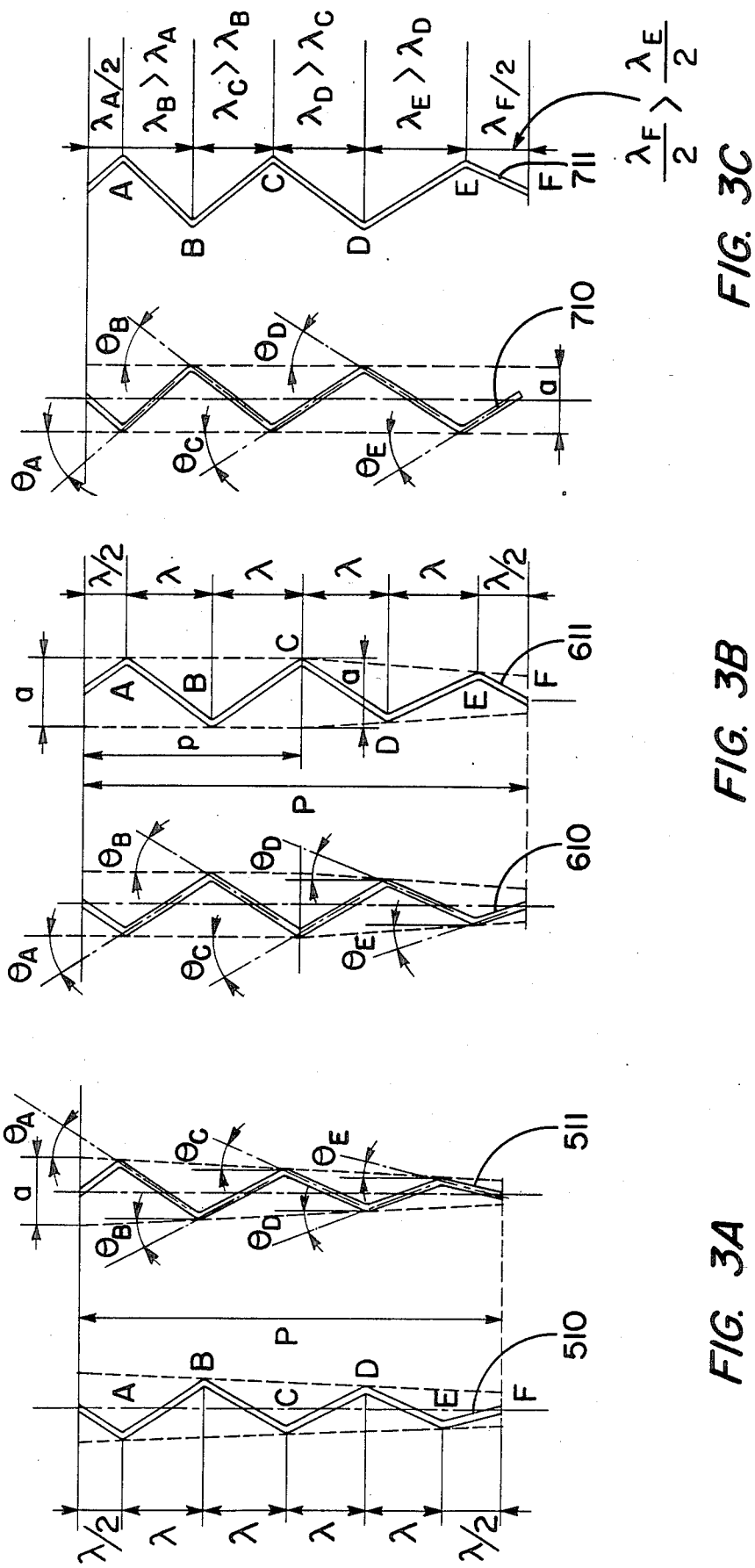
FIGS. 3A, 3B, 3C are views, on the same radial sectional plane, of preferred variants of the invention.

On the other hand, in the case of tires having a tread whose thickness is equal to or greater than 13 mm, it is advantageous, in order to obtain the best compromise between adherence, wear life and road behavior during the entire life of the tire, that the angle $\theta$ which a segment of the trace of the incision makes with the normal to the surface of the tread not be constant as a function of the depth but decrease as a function thereof, as shown in FIGS. 3A,3B,3C.

FIG. 3A shows two incisions 510,511 in accordance with the invention having a decrease in the angles $\theta$ as a function of the depth P. This decrease is obtained by the linear decrease, as a function of depth P, of the circumferential distance or amplitude a with a constant radial distance or pseudo-wavelength $\lambda_x$. The angles $\theta$ vary from $\theta_A$, equal to 35° for the segments closest to the surface of the tread, to $\theta_E$, equal to 10° for the segments closest to the tread reinforcement (not shown).

FIG. 3B shows a variant in accordance with which the circumferential distance or amplitude a remains constant over a given depth p at least equal to 0.5 P and then decreases linearly as a function of the depth P, the angles $\theta$ then decreasing from 35° to 10° at the bottom of the incisions.

When the block is provided with incisions which are as close as possible to each other, the distance d between the incisions being then slightly greater than 3.5 mm, it is preferable to obtain the decrease of the angles $\theta$ as a function of the depth P while retaining the constant circumferential distance or amplitude a as shown in FIG. 3C. It is then the radial distance or pseudo-wavelengths $\lambda_x$ which increase as a function of the depth P, either linearly (FIG. 3C) or remaining constant over a given depth p and then increasing up to the depth P (not shown).

The four above variants thus make it possible to regulate the rigidity of the strips defined by the incisions as a function of the depth, making them more mobile as a function of the rate of wear of the tread. This increase of mobility compensates for the rigidifying effect of the subjacent tread reinforcement, this effect being greater at the base of the strips.

Finally, the invention makes it possible to treat the elements in relief differently along their axial and circumferential directions, depending on their positions on the tread. By way of illustration and not of limitation, the blocks 11 at the center of the tread 1 can advantageously be provided with incisions the amplitudes a and the pseudo-wavelengths $\lambda_x$ of which are constant as a function of the depth P and equal for all the blocks. On the other hand, the blocks 13 of the lateral zones of the tread 1 are provided with incisions having a depth P' different from P and the amplitudes a' of which, which are different from a, will decrease linearly with the depth P', the pseudo-wavelengths $\lambda'_x$, which are different from $\lambda_x$, being constant.

Although the invention fundamentally concerns the blocks of a tread, it would not be going beyond the scope of the invention to use such incisions on ribs, whether or not associated with blocks. If ribs are associated with blocks, these ribs can also be provided with incisions different from those of the blocks and, in particular, not in accord with the invention from the point of view of their traces on the tread, their inclination with respect to the normal to the surface of the tread, and their orientation on the surface of the tread.

What is claimed is:

1. A tread for tires with radial carcass reinforcement, comprising at least elements in relief or blocks, separated by circumferential grooves and transverse grooves and provided with incisions of a width between about 0.1 mm and 2 mm, the incisions having on the surface of the tread rectilinear traces which form with the axial direction angles at most equal in absolute value to 30° and which are parallel to each other and to the traces of the transverse grooves, two adjacent incisions defining a strip of rubber the axial dimension of which is at least equal to 30% of the corresponding axial width of the element in relief, characterized by the fact that each element in relief comprises an even number of incisions of equal depth and having in cross-section over the entire depth broken line or undulated line traces with mean axes perpendicular to the surface of the tread and formed of segments forming angles
defining crests, said segments forming angles which are other than zero and at most equal to 40° with the normal to said surface, the trace of an incision being a mirror image of the trace of a circumferentially adjacent incision.

2. A tread according to claim 1, characterized by the fact that the circumferential distance separating the mean axes of two adjacent incisions or the mean axes of the walls of the delimiting grooves from the mean axes of the closest incisions is a constant at least equal to 3.5 mm.

3. A tread according to claim 1 or 2, characterized by the fact that the number of crests of an incision is at least equal to 3.

4. A tread according to claim 3, characterized by the fact that the radial distance between two successive crests of one and the same incision is at least equal to 0.125 times the depth of the incision.

5. A tread according to claim 4, characterized by the fact that the circumferential distance between two successive crests of one and the same incision is between 0.5 times and 1.5 times the radial distance between the same two successive crests.

6. A tread according to claim 5 characterized by the fact that the circumferential distance and the radial distance are constant as a function of the depth of the incision.

7. A tread according to claim 5, characterized by the fact that the circumferential distance decreases linearly as a function of the depth of the incision, the radial distance being constant.

8. A tread according to claim 5, characterized by the fact that the circumferential distance is constant over a given depth, and then decreases linearly as a function of the depth of the incision, the radial distance being constant.

9. A tread according to claim 5, characterized by the fact that the circumferential distance is constant as a function of the depth of the incision, the radial distance increasing as a function of the depth of the incision.

* * * * *